J. F. MEIGS & R. P. STOUT.
TIME FUSE FOR PROJECTILES.
APPLICATION FILED JAN. 14, 1908.
993,091.
Patented May 23, 1911.
3 SHEETS—SHEET 1.
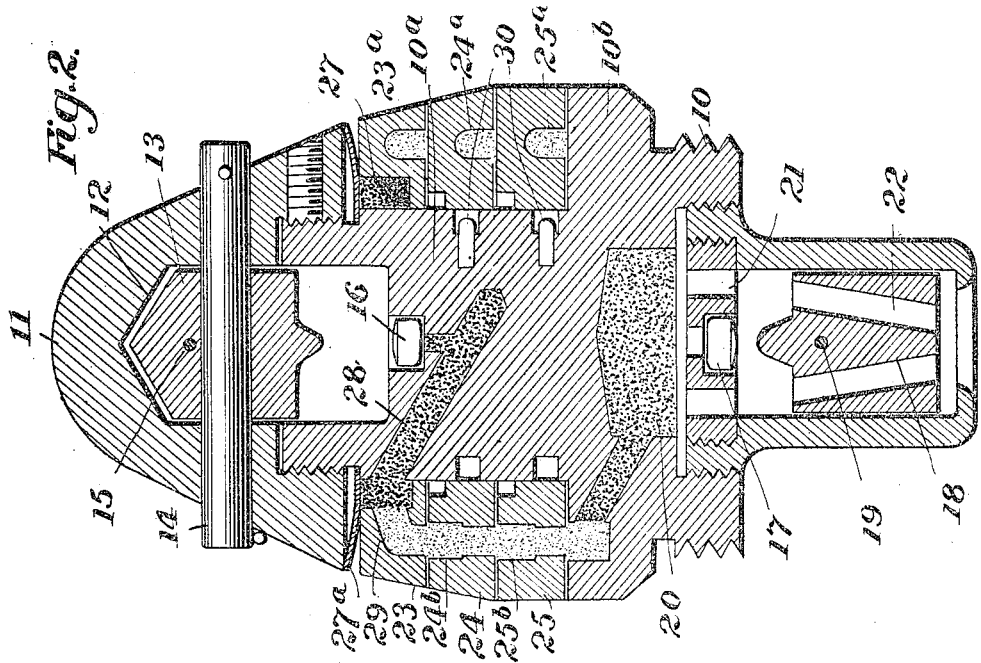
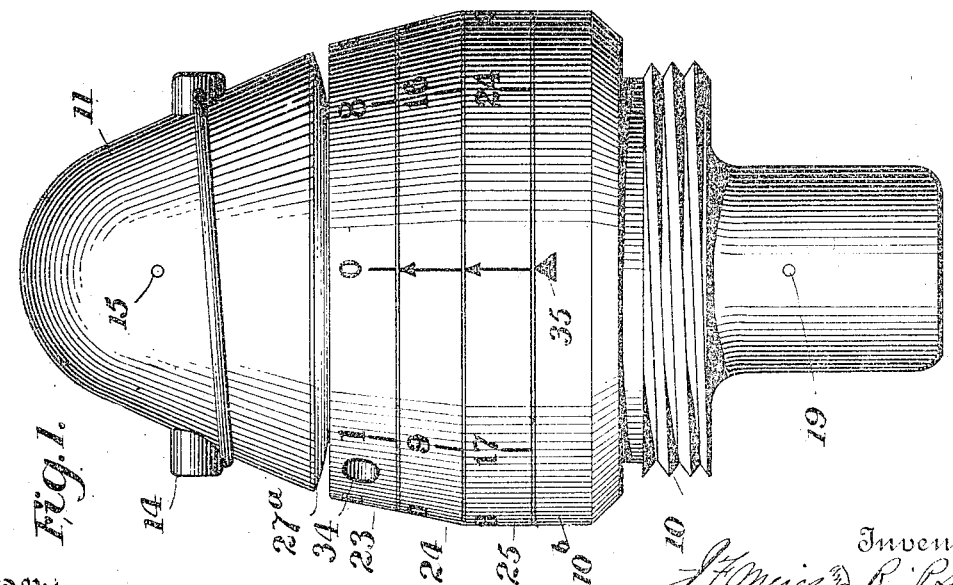
Witnesses
J. G. Hinkel
J. J. McCarthy
Inventors
J. F. Meigs
R. P. Stout
By Foster Freeman Watson & Coit
Attorneys J. F. MEIGS & R. P. STOUT.
TIME FUSE FOR PROJECTILES.
APPLICATION FILED JAN. 14, 1908.
993,091.
Patented May 23, 1911.
3 SHEETS—SHEET 2.
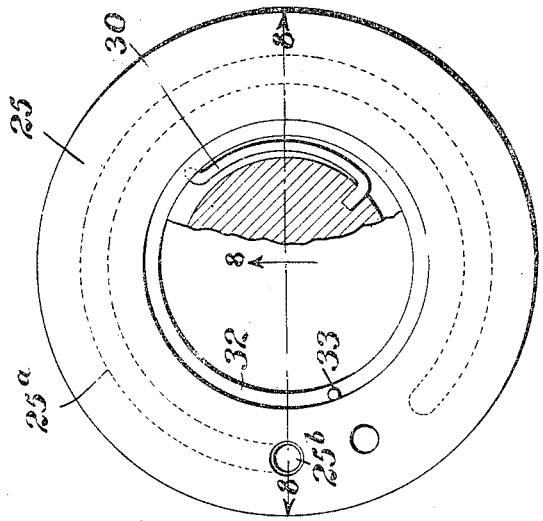
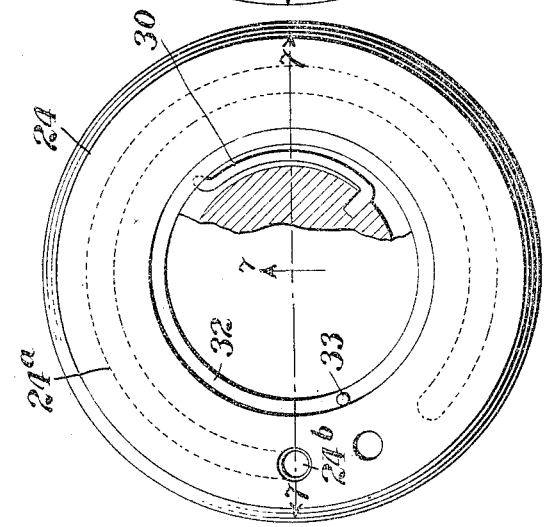
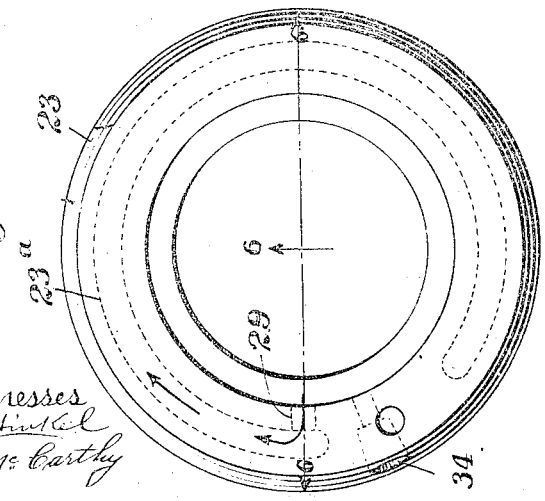
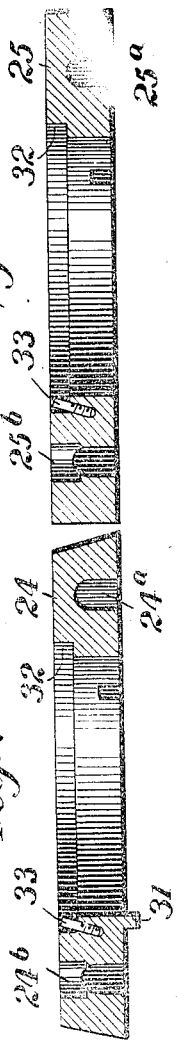
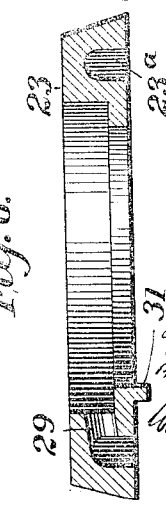
Witnesses
Inventors
J. F. Meigs and
R. P. Stout
By Foster Freeman
Watson & Coit
Attorneys

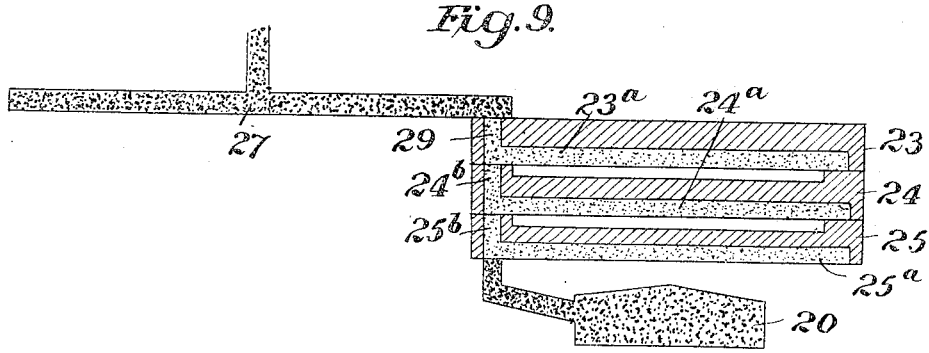
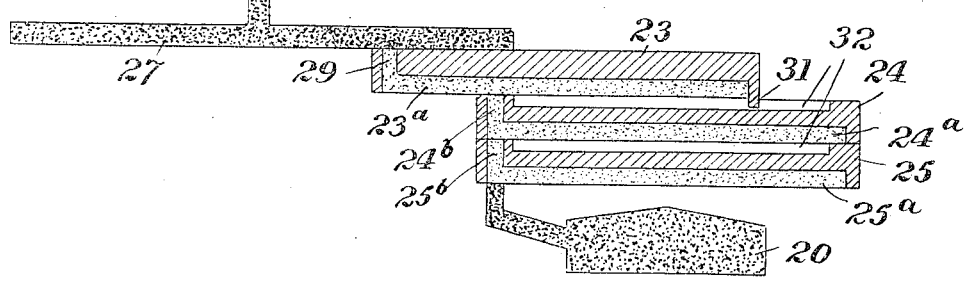
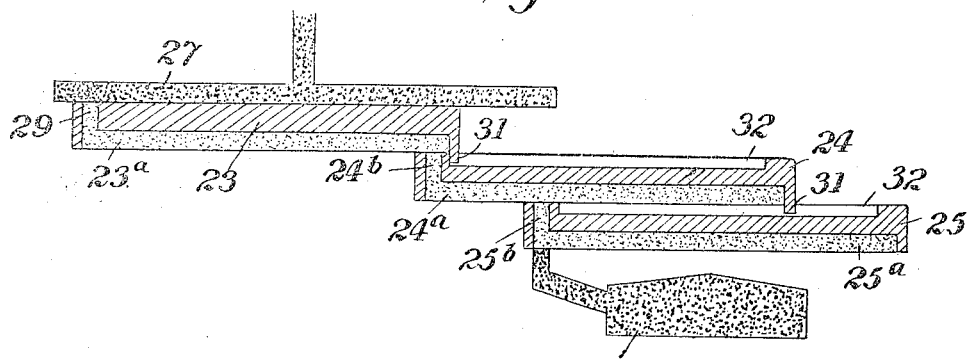

UNITED STATES PATENT OFFICE.

JOHN F. MEIGS AND ROBERT P. STOUT, OF SOUTH BETHLEHEM, PENNSYLVANIA, ASSIGNORS TO BETHLEHEM STEEL COMPANY, OF SOUTH BETHLEHEM, PENNSYLVANIA, A CORPORATION OF PENNSYLVANIA.

TIME-FUSE FOR PROJECTILES.

993,091.      Specification of Letters Patent.      Patented May 23, 1911.

Application filed January 14, 1908. Serial No. 410,769.

*To all whom it may concern:*

Be it known that we, JOHN F. MEIGS and ROBERT P. STOUT, citizens of the United States, and residents of South Bethlehem, Northampton county, State of Pennsylvania, have invented certain new and useful Improvements in Time-Fuses for Projectiles, of which the following is a specification.

In multiple train time fuses for explosive projectiles it has heretofore been customary to adjust the rings or other devices carrying the several trains or sections of the fuse relatively to interpose more or less of the line of fuse composition between the primary igniting device or primer and the explosive charge in the shell to delay the bursting of the shell more or less according to requirements.

The present invention relates to improved means for effecting the relative adjustment of the fuse rings and to various details of construction which will be hereinafter pointed out.

We shall proceed to describe the invention in connection with the accompanying drawing, in which, Figure 1 is a side view of a fuse embodying the present invention; Fig. 2 is a vertical central section through the fuse shown in Fig. 1; Figs. 3, 4 and 5 are respectively plan views of the top, middle and bottom fuse rings; Figs. 6, 7 and 8 are sectional views on the lines 6—6, 7—7, and 8—8 of Figs. 3, 4 and 5 respectively. Figs. 9, 10 and 11 are diagrams illustrating the manner of adjusting the several fuse rings to vary the time of the explosion.

Referring to Figs. 1 and 2 of the drawing, 10 indicates the stock of the fuse, which is adapted to be connected with the point of the projectile and 11 the cap, which is attached to the forward end of the stock. Within the cap is a hammer chamber 12, containing a movable hammer 13 which is normally retained in inoperative position by a key 14. When the projectile is about to be fired the key is withdrawn to release the hammer. The hammer is then retained in position temporarily by a wire 15 which is sheared by the inertia of the hammer when the projectile is fired. At the base of the hammer chamber is a percussive cap or primer 16. In the lower end or base of the stock is a second primer 17 adapted to be ignited by the blow of a hammer 18 which is normally retained in inoperative position by a shear wire 19. A chamber 20 above the primer 17 is filled with explosive material and passages 21, 22, are provided in the primer seat and the hammer 18 to permit the flame from the chamber 20 to pass to the explosive charge in the projectile.

On the upper cylindrical portion $10^a$ of the stock three rings 23, 24, 25 are mounted, the lower ring resting on a flange $10^b$ of the stock and being of substantially the same diameter and the upper ring being situated just beneath the cap 11. It will be understood that our invention contemplates the use of two or more fuse rings and that the construction having three rings is shown simply for illustration. The several rings have annular recesses $23^a$, $24^a$, $25^a$, in their under sides extending nearly but not quite around the rings. The channel $25^a$ is closed by the flange $10^b$ of the fuse stock and the channels $23^a$, $24^a$, are closed by the rings below them. The upper ring 23, upon which the spring washer $27^a$ bears, has an annular recess 27 which is in communication with the primer 16 through a channel 28 in the stock. The recess or channel 27 and the channel 28 are charged with rapid burning powder which communicates ignition quickly from the primer to the fuse in the ring 23. The channel 27 communicates with the fuse channel in the ring 23 through an opening 29. It will thus be seen that the fire from the primer 16 is rapidly communicated to the fuse in the ring 23 in any adjustment of said ring.

In the position of the rings illustrated in Fig. 2, there is a direct communication between the recess 27 and the magazine chamber 20 and if the projectile were fired while the rings are in this position the explosive charge in the projectile would be immediately ignited. The ignition of the explosive charge is delayed more or less by adjusting the several fuse rings and these rings are so constructed and interlocked that any adjustment of the three rings which may be desired can be effected by turning the uppermost ring. The lower rings 24, 25, are normally maintained in the position shown in Fig. 2 by suitable spring latches 30 which are seated in the fuse stock and engage notches or recesses in the rings. These latches prevent their respective rings from being moved accidentally or by frictional engagement with the adjacent rings but they yield when the rings are positively moved, as hereinafter set forth. The uppermost ring, 23, has a depending lug 31 which travels in an annular groove 32 in the next lower ring 24 and is adapted to engage a pin or shoulder 33 projecting into said groove 32. The ring 23 is provided with an opening 34 which serves as a vent and also for the insertion of a rod or handle by means of which the ring can be turned. The intermediate ring 24 is likewise provided with a depending stud or shoulder 31 which travels in an annular groove 32 in the lower ring 25 and is adapted to engage a stud or shoulder 33 projecting into said recess. The fuse channel 23ª communicates with the fuse channel 24ª through an opening 24ᵇ and the fuse channel 24ª communicates with the fuse channel 25ª through an opening 25ᵇ.

The fuse rings are provided on their outer faces with suitable scales which may indicate either the time or the distance at which the fuse train is set. A rod or handle is inserted in the opening in the upper train ring 23 and this ring is turned continuously until the graduation on one of the rings indicating the time or distance is opposite the indicating mark 35. If the time of flight is so short that there is sufficient fuse in the train ring 23, the lower rings will not be disturbed. If however a greater length of fuse is necessary than is contained in the ring 23, the stud 31 on the bottom of this ring will engage the stud 33 on the ring 24 just as the end of the train in the ring 23 registers with the opening 24ᵇ and the ring 24 will thereafter be carried around with the ring 23. In like manner the ring 25 may be carried around with the ring 24. It will be seen that by a continuous movement of the ring 23 in one direction any desired amount of the fuse contained in the three rings can be rendered effective. When loading or handling the projectile the ring 23 may be turned backward to bring a solid portion between the ends of the groove 23ª into register with the opening 24ᵇ thus cutting off communication between the rings 23 and 24.

Referring to the diagrams, Figs. 9, 10 and 11, which illustrate developments of several rings, it will be seen that in Fig. 9 the several rings are set as in Fig. 2 to effect immediate explosion of the shell charge after firing. In Fig. 10 the upper ring 23 is shown adjusted slightly to the left, thus rendering that portion of its fuse between the opening 29 and the opening 24ᵇ effective. In Fig. 11 the ring 23 is shown as having made more than a complete revolution and having carried the ring 24 with it through a part of a revolution. It will be seen that the entire fuse in the ring 23 and a portion of the fuse in the ring 24 are thus rendered effective, and that the fuse in both rings burns in the same direction. In like manner all three sections of the fuse may be adjusted into a single train burning in the same direction throughout.

It will be noted that in the fuse herein described all of the rings or fuse sections move in the same direction, that is, it is only necessary to move or rotate one of said sections, the remaining sections being picked up successively and automatically and adjusted to any desired extent; and it will also be noted that the fuse in all of the sections burns in the same direction. It will be obvious that these features of our invention may be attained by various constructions and hence we do not desire to be understood as limiting ourselves to the particular construction and arrangement illustrated and described herein.

Having described our invention what we claim and desire to secure by Letters-Patent is, 1. In a multiple train time fuse, a plurality of fuse sections, and means whereby said sections are movable successively in the same direction to time the fuse.

2. In a multiple train time fuse, a plurality of fuse rings, and means whereby said rings are rotatable successively in the same direction to time the fuse.

3. In a multiple train time fuse, a plurality of fuse sections and connections between said sections whereby they are moved successively in timing the fuse.

4. In a multiple train time fuse, a plurality of fuse rings and connections between said rings whereby they are rotated successively to time the fuse.

5. In a multiple train time fuse, a plurality of fuse rings and connections between said rings whereby when one ring has been moved to render its fuse section operative it will engage and move with it the adjacent ring, for the purpose set forth.

6. In a multiple train time fuse, a plurality of fuse rings, said fuse rings being movable in succession in the same direction to time the fuse.

7. In a multiple train time fuse, a plurality of fuse rings and connections between said rings whereby upon rotation of one ring the remaining ring or rings are picked up successively and rotated in the same direction.

8. In a multiple train time fuse the combination with a fuse stock and two fuse rings mounted to rotate on said stock, of a spring latch for yieldingly holding one of said rings in a given position on the stock, and means whereby when the other ring has been rotated to render its fuse section opertive the yieldingly held ring will be picked up and rotated in the same direction.

9. In a multiple train time fuse, the combination with a stock, of two rotatable fuse rings mounted thereon, and a stud or shoulder on each of said rings projecting into the path of that on the other, whereby one of said rings is adapted to engage and move the other, for the purpose set forth.

In testimony whereof we affix our signatures in presence of two witnesses.

JOHN F. MEIGS.
ROBERT P. STOUT.

Witnesses:
EDWIN A. MILLER,
H. L. NIESS.